(12) United States Patent
Cheng et al.

(10) Patent No.: US 9,165,729 B2
(45) Date of Patent: Oct. 20, 2015

(54) KEYBOARD DEVICE

(71) Applicant: WISTRON CORP., New Taipei (TW)

(72) Inventors: Ting-Yao Cheng, New Taipei (TW);
Shih-Jung Chuang, New Taipei (TW);
Chih-Ta Chen, New Taipei (TW);
Yao-Wei Wang, New Taipei (TW)

(73) Assignee: WISTRON CORP., New Taipei City (TW)

( * ) Notice: Subject to any disclaimer, the term of this patent is extended or adjusted under 35 U.S.C. 154(b) by 0 days.

(21) Appl. No.: 14/054,817

(22) Filed: Oct. 15, 2013

(65) Prior Publication Data
US 2014/0216907 A1 Aug. 7, 2014

(30) Foreign Application Priority Data

Feb. 7, 2013 (TW) .............................. 102104909 A (51) Int. Cl.
| *G06F 3/02* | (2006.01) |
| *H01H 13/7065* | (2006.01) |
| *H01H 13/83* | (2006.01) |
| *G06F 3/01* | (2006.01) |
| *G09B 21/00* | (2006.01) |

(52) U.S. Cl.
CPC ........... *H01H 13/7065* (2013.01); *H01H 13/83* (2013.01); *G06F 3/016* (2013.01); *G06F 3/0202* (2013.01); *G09B 21/004* (2013.01); *H01H 2217/046* (2013.01)

(58) Field of Classification Search
USPC ........................................................ 400/490
See application file for complete search history.

(56) References Cited

U.S. PATENT DOCUMENTS

| 4,517,421 | A | * | 5/1985 | Margolin ........................ 341/27 |
| 5,222,895 | A | * | 6/1993 | Fricke ............................ 434/113 |
| 5,496,174 | A | * | 3/1996 | Garner .......................... 434/114 |
| 5,802,171 | A |   | 9/1998 | Deutsch |
| 6,881,063 | B2 | * | 4/2005 | Yang ............................. 434/114 |

(Continued)

FOREIGN PATENT DOCUMENTS

| CN | 202406149 U | 8/2012 |
| TW | 241938 | 2/1995 |
| TW | M315471 U | 7/2007 |

OTHER PUBLICATIONS

The office action of the corresponding Taiwanese application.

(Continued)

*Primary Examiner* — Jill Culler
(74) *Attorney, Agent, or Firm* — CKC & Partners Co., Ltd.

(57) ABSTRACT

A keyboard device is located in an accommodating space of a housing having first openings and a second opening. The keyboard device includes a flexible body and a transparent liquid. The flexible body is located in the accommodating space, and includes a main body, first pressing portions, patterns, and a second pressing portion. The first pressing portions are respectively located in the first openings. The patterns are located on the main body or the first pressing portions and are respectively exposed through the first openings. The second pressing portion is located in the second opening. The main body, and the first and second pressing portions have an enclosure space therein. The transparent liquid is located in the enclosure space. When the second pressing portion is pressed, the first pressing portions expand to protrude from the first openings, such that the patterns are enlarged.

8 Claims, 9 Drawing Sheets

(56) References Cited

U.S. PATENT DOCUMENTS

| | | | |
|---|---|---|---|
| 8,154,527 B2 * | 4/2012 | Ciesla et al. | 345/173 |
| 8,456,438 B2 * | 6/2013 | Ciesla et al. | 345/173 |
| 2009/0174673 A1 * | 7/2009 | Ciesla | 345/173 |
| 2009/0174687 A1 * | 7/2009 | Ciesla et al. | 345/174 |
| 2010/0103137 A1 * | 4/2010 | Ciesla et al. | 345/174 |

OTHER PUBLICATIONS

The office action of the corresponding Chinese application issued on Jul. 3, 2015 and its partial English translation of the markup paragraph.

* cited by examiner

KEYBOARD DEVICE

RELATED APPLICATION

This application claims priority to Taiwanese Application Serial Number 102104909, filed Feb. 7, 2013, which is herein incorporated by reference.

BACKGROUND

1. Technical Field

The present disclosure relates to a keyboard device.

2. Description of Related Art

With the development of science and technology, many kinds of consumer electronic products are being sold in the consumer market. Methods of inputting signals of electronic products may include remote input, touch input, mouse input, button input, etc. Physical buttons are more intuitive for users, and in addition, physical buttons have the advantages of allowing for quick operation and for providing a good tactile sensation for users. Therefore, physical buttons are widely used in as part of the input device in various electronic products, such as cellular phone key pads, telephone key pads, and computer keyboards.

The surfaces of keys often have numbers or letters provided thereon. However for users who are elderly or have poor eyesight, the small numbers and letters on the keys are not easily read. Therefore, manufacturers need to manufacture specific models of electronic products having large keys, and they must print large numbers and letters on the keys for such users. As a result, the large keys occupy a significant amount of space of the electronic product, such that it is difficult to reduce the overall size of the electronic product. Additionally, the cost of the electronic product is increased.

In the case of handheld electronic products, the size of the keys thereof is limited by the size of the housings of such electronic products. Hence, the handheld electronic product only can use small keys and cannot use large keys. That is to say, even if the numbers and letters printed on such keys are the same size as the keys, users who are elderly or have poor eyesight still cannot read the numbers and letters, often leading to the users easily pressing the wrong keys.

SUMMARY

An aspect of the present invention is to provide a keyboard device located in an accommodating space of a housing. The housing has a plurality of first openings and a second opening, and the first and second openings are communicated with the accommodating space.

According to an embodiment of the present invention, a keyboard device includes a flexible body and a transparent liquid. The flexible body is located in the accommodating space and includes a main body, a plurality of first pressing portions, a plurality of patterns, and a second pressing portion. The first pressing portions protrude from the main body and are respectively located in the first openings. The patterns are located on a surface of the main body or surfaces of the first pressing portions. The patterns are respectively exposed through the first openings. The second pressing portion protrudes from the main body, and is located in the second opening. The main body, and the first and second pressing portions have an enclosure space therein, such that the main body, and the first and second pressing portions are communicated with each other. The transparent liquid is located in the enclosure space. When the second pressing portion is pressed, the first pressing portions expand to protrude from the first openings due to the transparent liquid flowing into the first pressing portions, such that the patterns are enlarged.

In an embodiment of the present invention, the transparent liquid includes silicone or hydraulic oil.

In an embodiment of the present invention, the viscosity of the transparent liquid is in a range from 1500 to 50000 CPS.

In an embodiment of the present invention, the flexible body is made of a material that includes plastic or rubber.

In an embodiment of the present invention, the main body, and the first and second pressing portions are integrally formed as a single piece.

In an embodiment of the present invention, the area of the second pressing portion is larger than the area of each of the first pressing portions.

In an embodiment of the present invention, the patterns comprise numbers, symbols, letters, or combinations thereof.

In an embodiment of the present invention, each of the first pressing portions has at least one protruding point, and a space in each of the protruding points is communicated with the enclosure space. When the second pressing portion is pressed, the transparent liquid adjacent to the second pressing portion is displaced to force the transparent fluid in other parts of the enclosure space to flow to the first pressing portions and the protruding points such that the protruding points expand to protrude from the first pressing portions.

In an embodiment of the present invention, the protruding points are arranged in a Braille arrangement.

An aspect of the present invention is to provide a keyboard device located in a first accommodating space of a housing. The housing has a plurality of openings communicated with the first accommodating space.

According to an embodiment of the present invention, a keyboard device includes a flexible body, a fluid, and a pump. The flexible body is located in the first accommodating space and includes a main body, a plurality of pressing portions, and a plurality of patterns. The pressing portions protrude from the main body, and are respectively located in the openings. The main body and the pressing portions have a second accommodating space therein, such that the main body and the pressing portions are communicated with each other. The patterns are located on a surface of the main body or surfaces of the pressing portions. The patterns are respectively exposed through the openings. The fluid is located in the second accommodating space. The pump is connected to the second accommodating space. When the fluid is compressed by the pump, the pressing portions expand to protrude from the openings, such that the patterns are enlarged.

In an embodiment of the present invention, the fluid includes silicone, hydraulic oil, water, air, oxygen, or nitrogen.

In an embodiment of the present invention, the flexible body is made of a material that includes plastic or rubber.

In an embodiment of the present invention, the main body and the pressing portions are integrally formed as a single piece.

In an embodiment of the present invention, the patterns include numbers, symbols, letters, or combinations thereof.

In an embodiment of the present invention, each of the pressing portions has at least one protruding point, and a space in each of the protruding points is communicated with the second accommodating space. When the fluid is compressed by the pump, the fluid flows to the pressing portions and the protruding points, such that the protruding points expand to protrude from the pressing portions.

In an embodiment of the present invention, the protruding points are arranged in a Braille arrangement.

In the aforementioned embodiments of the present invention, when the keyboard device includes the flexible body and the transparent liquid, since the transparent liquid is located in the enclosure space of the flexible body, the transparent liquid adjacent to the second pressing portion is displaced to force the transparent liquid in other parts of the enclosure space to flow to the first pressing portions by pressing the second pressing portion. As a result, the first pressing portions can expand to protrude from the first openings of the housing, such that the first pressing portions have a convex lens function. Hence, the patterns can be enlarged. When the keyboard device includes the flexible body, the fluid, and the pump, since the fluid is located in the second accommodating space of the flexible body, the fluid can be compressed by the pump, such that the pressing portions expand to protrude from the openings. As a result, the pressing portions have a convex lens function, and the patterns still can be enlarged.

The keyboard device does not need to include large keys to allow for the printing of large numbers and letters thereon, so that the size of an electronic device having the keyboard device can be reduced. Therefore, the cost of the electronic device can be decreased. Furthermore, the keyboard device is not restricted by the size of the housing of the electronic device, so that the pressing portions with a small size can be used, and the patterns can be enlarged by the convex lens function of the pressing portions. The keyboard device can be provided for users who are elderly or have poor eyesight to enable such users to accurately read the patterns associated with the pressing portions, thereby minimizing situations in which users press the wrong keys.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
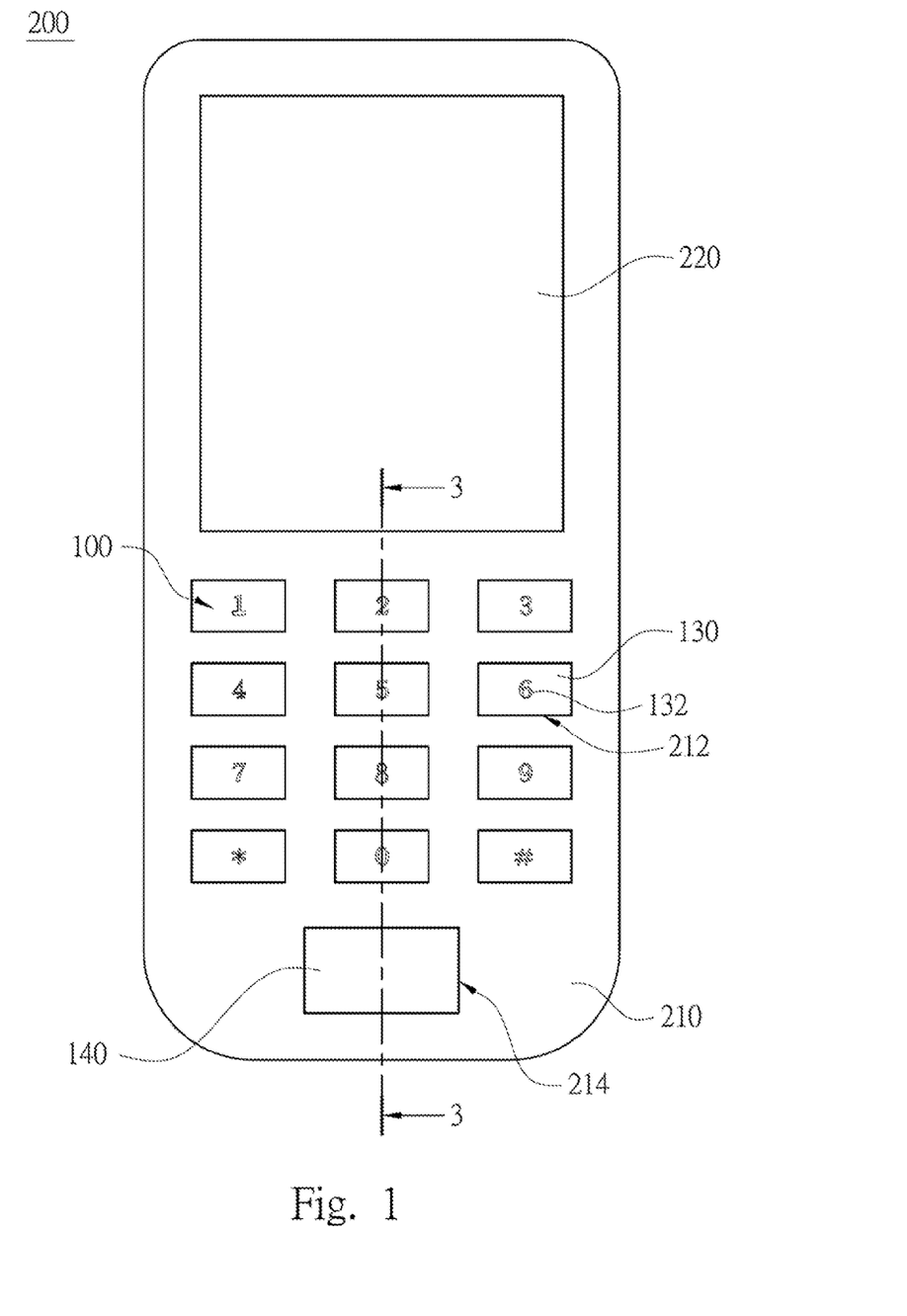
FIG. 1 is a front view of a keyboard device shown in a state mounted in an electronic device according to an embodiment of the present invention.
Figure 2:
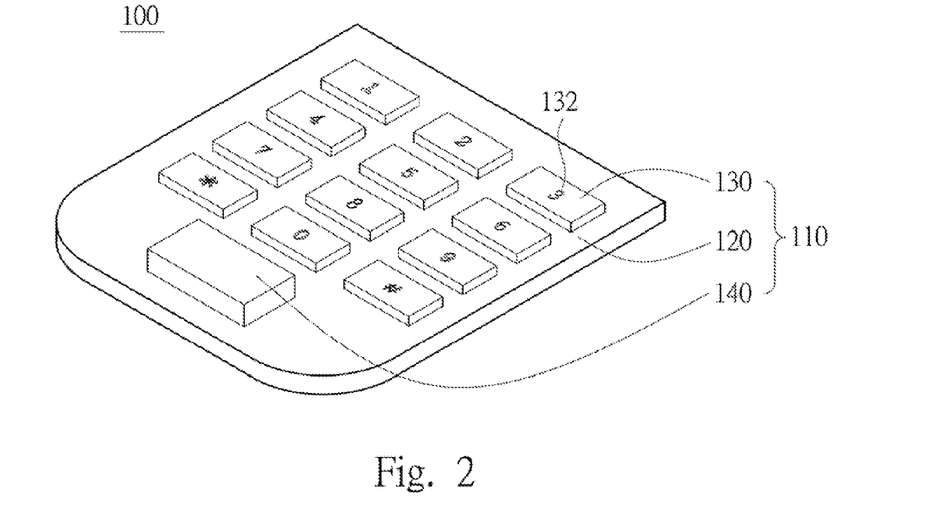
FIG. 2 is a perspective view of the keyboard device shown in FIG. 1.

FIG. 1 is a front view of a keyboard device 100 shown in a state mounted in an electronic device 200 according to an embodiment of the present invention. FIG. 2 is a perspective view of the keyboard device 100 shown in FIG. 1. As shown in FIG. 1 and FIG. 2, the electronic device 200 has a housing 210 and a screen 220. The housing 210 has a plurality of first openings 212 and a second opening 214. The keyboard device 100 includes a flexible body 110 and a transparent liquid (which will be described hereinafter) located in the flexible body 110. The flexible body 110 includes a main body 120, a plurality of first pressing portions 130 a plurality of patterns 132, and a second pressing portion 140. The first pressing portions 130 protrude from the main body 120 and are respectively located in the first openings 212 of the housing 210 The patterns 132 are located on a surface of the main body 120 or respectively on surfaces of the first pressing portions 130. The patterns 132 are respectively exposed through the first openings 212 of the housing 210. The second pressing portion 140 protrudes from the main body 120, and is located in the second opening 214 of the housing 210.

In this embodiment, the main body 20, and the first and second pressing portions 130, 140 are integrally formed as a single piece. The area of the second pressing portion 140 is larger than the area of each of the first pressing portions 130, and the height of the second pressing portion 140 is greater than the height of each of the first pressing portions 130. The flexible body 110 has elasticity, and may be made of a material that includes plastic or rubber, but the present invention is not limited in this regard. In addition, the patterns may include numbers, symbols, letters, or combinations thereof as deemed necessary by designers. The electronic device 200 may be a cellular phone, a telephone, or another electronic product having a key structure.

Figure 3:
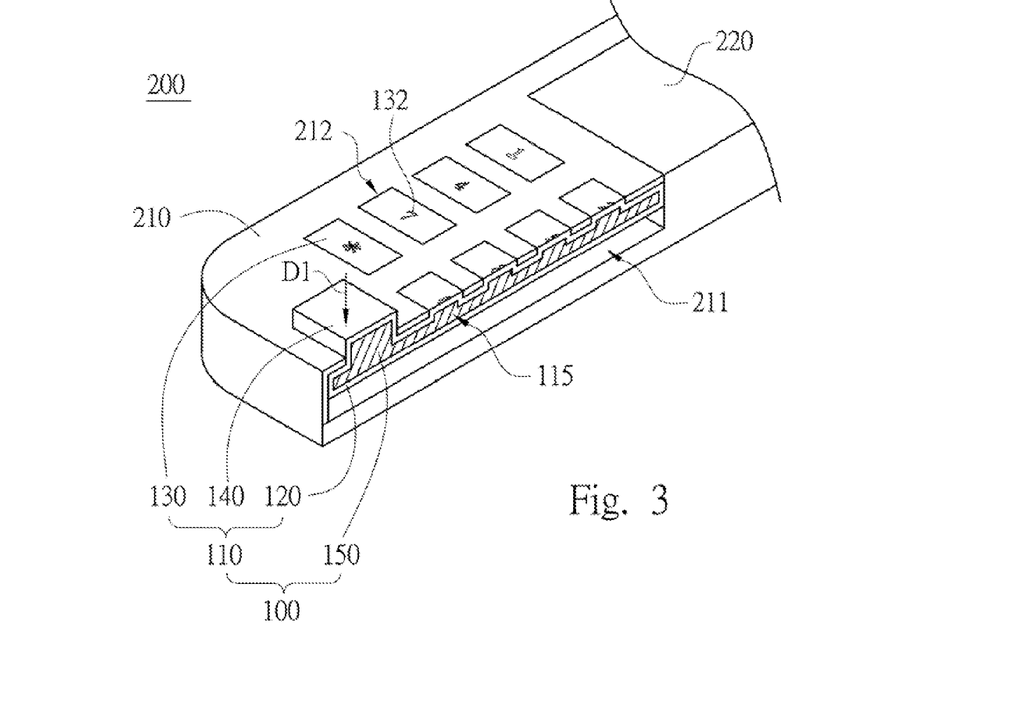
FIG. 3 is a cross-sectional view of the electronic device shown in FIG. 1 taken along line 3-3.
Figure 4A:
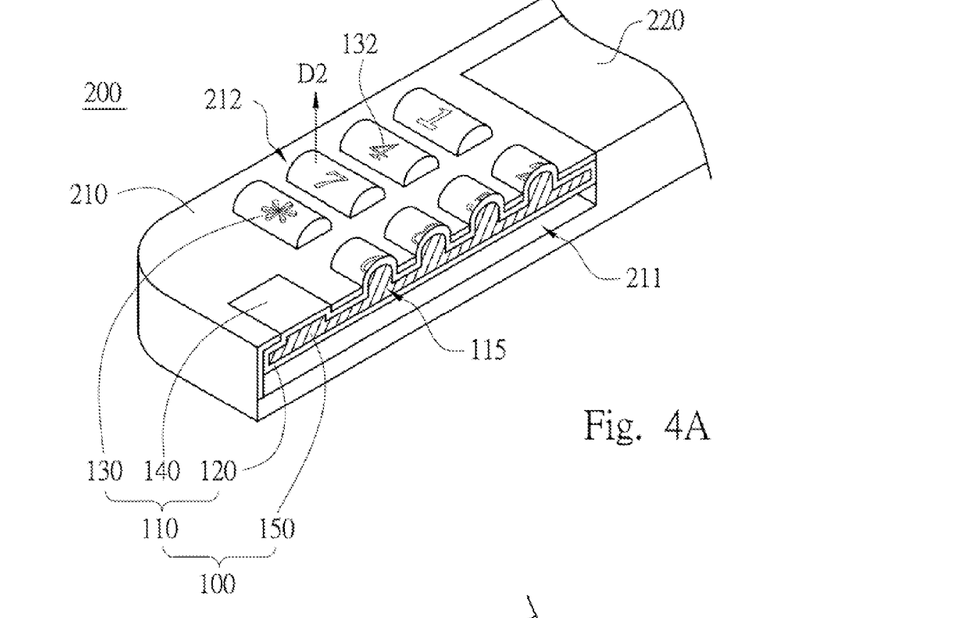
FIG. 4A is a cross-sectional view of the electronic device shown in FIG. 3 after a second pressing portion of the keyboard device is pressed in a direction D1.

FIG. 3 is a cross-sectional view of the electronic device 200 shown in FIG. 1 taken along line 3-3. FIG. 4A is a cross-sectional view of the electronic device 200 shown in FIG. 3 after the second pressing portion 140 of the keyboard device 100 is pressed in a direction D1. As shown in FIG. 3 and FIG. 4A, the keyboard device 100 is located in an accommodating space 211 of the housing 210, and the first and second openings 212, 214 are communicated with the accommodating space 211. The flexible body 110 is located in the accommodating space 211 of the housing 210.

The main body 120, and the first and second pressing portions 130, 140 of the flexible body 110 have an enclosure space 115 therein, such that the main body 120, and the first and second pressing portions 130, 140 are communicated with each other. The transparent liquid 150 is located in the enclosure space 115. In this embodiment, the transparent liquid 150 has a high viscosity, and may include silicone or hydraulic oil. The viscosity of the transparent liquid 150 may be in the range from 1500 to 50000 CPS, but the present invention is not limited in this regard.

When the second pressing portion 140 is pressed in the direction D1, the transparent liquid 150 adjacent to the second pressing portion 140 is displaced to force the transparent liquid 150 in other parts of the enclosure space 115 to flow to the first pressing portions 130, such that the first pressing portions 130 expand. That is, due to the transparent liquid 150 flowing into the first pressing portions 130, the first pressing portions 130 expand and therefore protrude from the first openings 212 of the housing 210 in a direction D2. As a result, the first pressing portions 130 have a convex lens function, such that the patterns 132 can be enlarged.

In use, a user can press the second pressing portion 140 in the direction D1, such that the first pressing portions 130 protrude the first openings 212 of the housing 210 in the direction D2, and the patterns 132 are enlarged. Thereafter, the user can release the second pressing portion 140 and press a number of the first pressing portions 130 as needed in the direction D1, such as to dial a phone number. When the user releases the second pressing portion 140, since the transparent liquid 150 has a high viscosity, the transparent liquid 150 does not flow quickly back to the second pressing portion 140. Therefore, the patterns 132 can remain enlarged for a period of time (e.g., 2 to 10 seconds) to allow for easy reading by the user. In this embodiment, the patterns 132 are located on the surface of the main body 120 of the flexible body 110 facing the transparent liquid 150, but the positions of the patterns 132 are not limited to the surface of the main body 120.

Figure 4B:
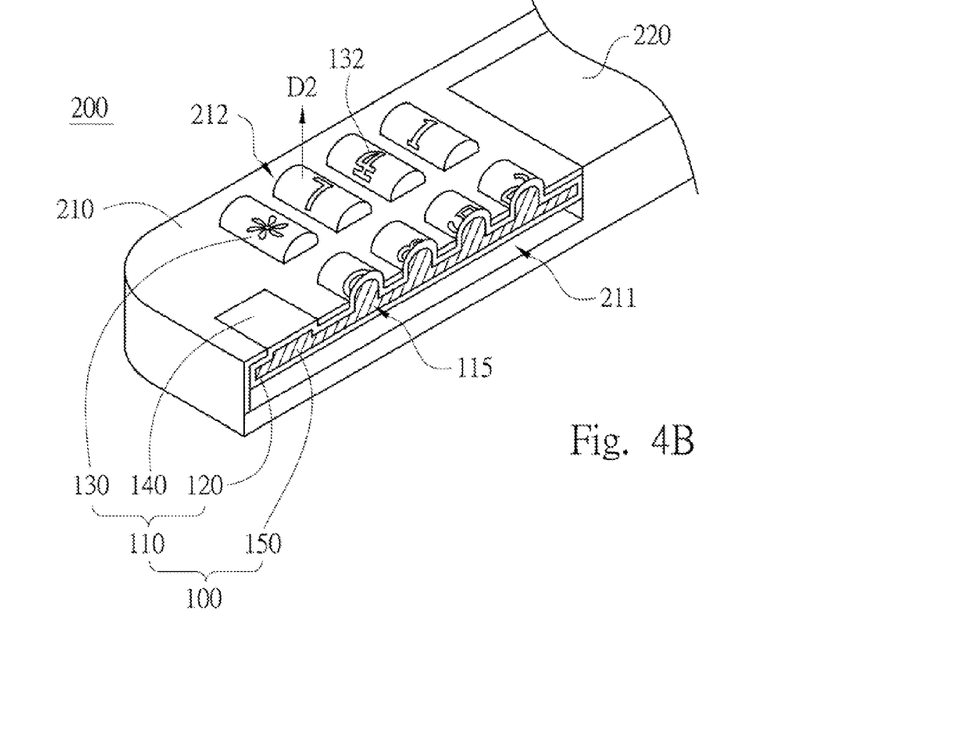
FIG. 4B is another embodiment of FIG. 4A.

FIG. 4B is another embodiment of FIG. 4A. The difference between this embodiment and the embodiment shown in FIG. 4A is that the patterns 132 are located on the surfaces of the first pressing portions 130 in this embodiment. For example, the patterns 132 can be selectively located on the surfaces of the first pressing portions 130 facing away from the transparent liquid 150 or on the surfaces of the first pressing portions 130 facing the transparent liquid 150 as deemed necessary by designers.

Figure 5:
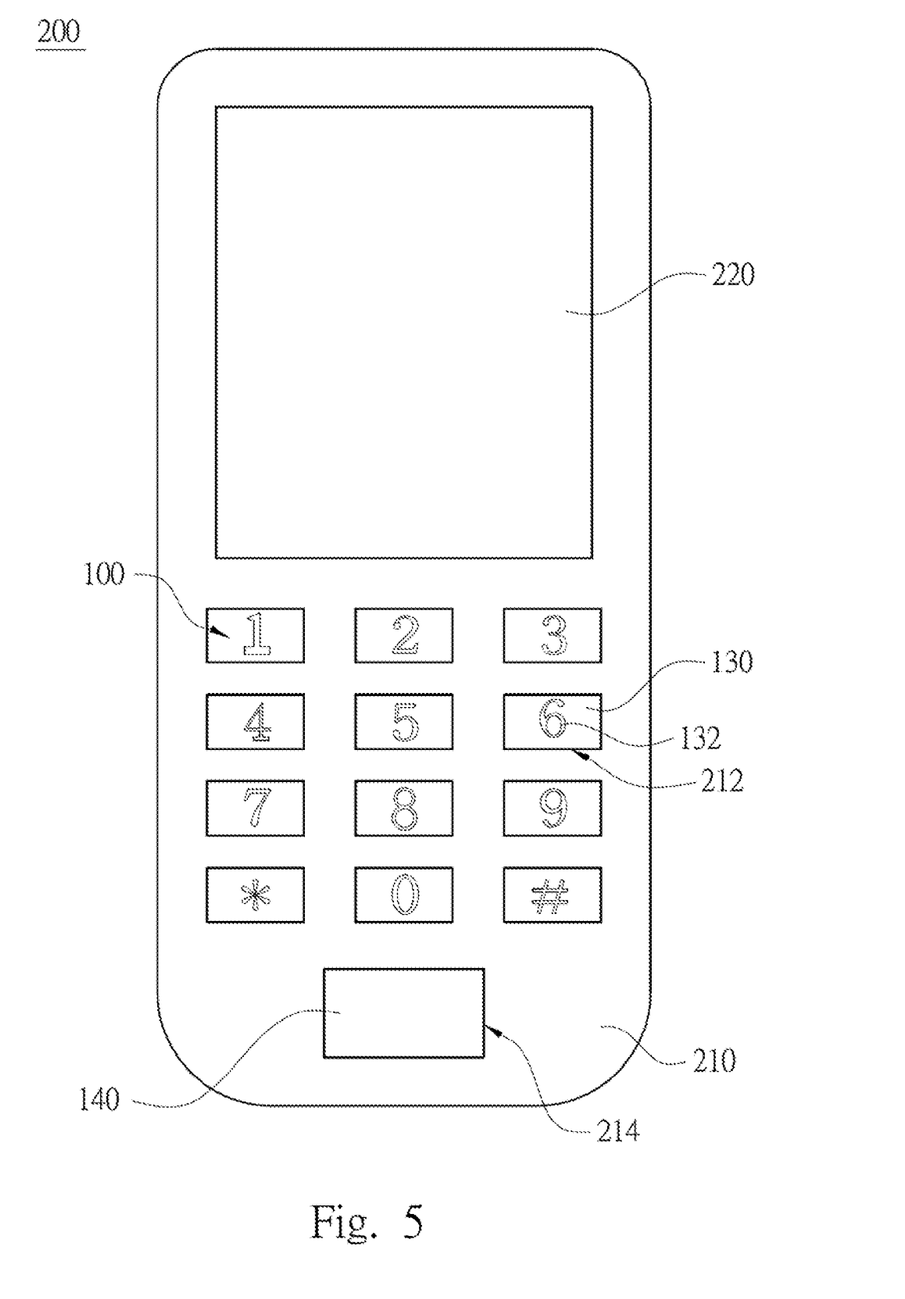
FIG. 5 is a front view of the electronic device shown in FIG. 1 after the second pressing portion of the keyboard device is pressed.

FIG. 5 is a front view of the electronic device 200 shown in FIG. 1 after the second pressing portion 140 of the keyboard device 100 is pressed. As shown in FIG. 1, FIG. 2 and FIG. 5, since the area and the height of the second pressing portion 140 are respectively greater than the area and the height of each of the first pressing portions 130, users are able to quickly locate and easily operate the second pressing portion 140. The keyboard device 100 does not need to include large keys to allow for the printing of large numbers and letters thereon, so that the size of the electronic device 200 having the keyboard device 100 can be reduced. Therefore, the cost of the electronic device 200 can be decreased. Furthermore, the keyboard device 100 is not restricted by the size of the housing 210 of the electronic device 200, so that the first pressing portions 130 with a small size can be used, and the patterns 132 can be enlarged by the convex lens function of the first pressing portions 130. As a result, the keyboard device 100 can be provided for users who are elderly or have poor eyesight to enable such users to accurately read the patterns 132 associated with the first pressing portions 130, thereby minimizing situations in which users press the wrong keys.

It is to be noted that the connection relationships and materials of the elements described above will not be repeated in the following description.

Figure 6:
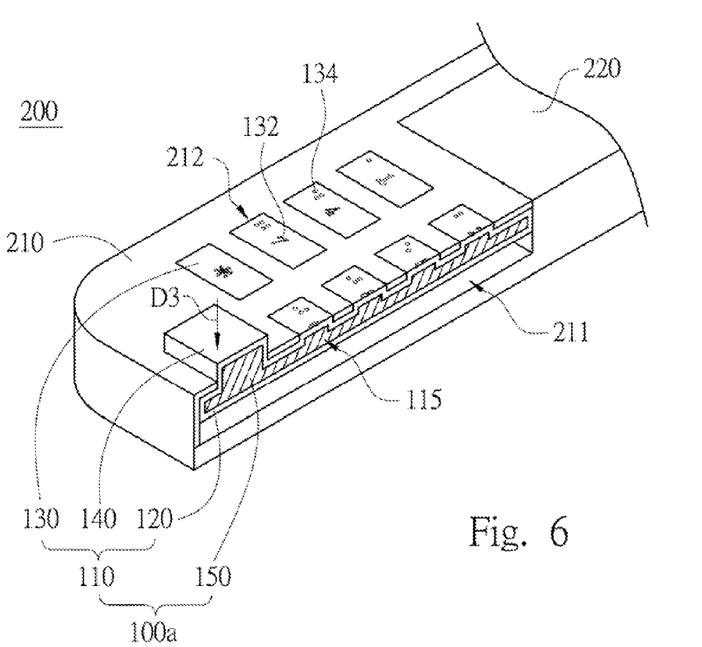
FIG. 6 is a cross-sectional view of a keyboard device shown in a state mounted in an electronic device according to an embodiment of the present invention.
Figure 7:
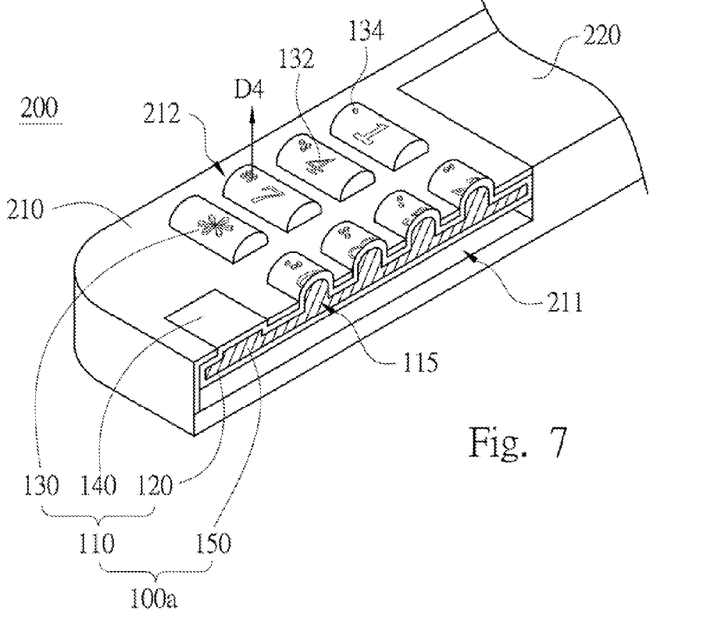
FIG. 7 is a cross-sectional view of the electronic device shown in FIG. 6 after a second pressing portion of the keyboard device is pressed in a direction D3.

FIG. 6 is a cross-sectional view of a keyboard device 100a shown in a state mounted in an electronic device 200 according to an embodiment of the present invention. FIG. 7 is a cross-sectional view of the electronic device 200 shown in FIG. 6 after the second pressing portion 140 of the keyboard device 100a is pressed in a direction D3. As shown in FIG. 6 and FIG. 7, the difference between this embodiment and the embodiment shown in FIG. 3 and FIG. 4A is that each of the first pressing portions 130 further has at least one protruding point 134, and a space in each of the protruding points 134 is communicated with the enclosure space 115. When the second pressing portion 140 is pressed in the direction D3, the transparent liquid 150 adjacent to the second pressing portion 140 is displaced to force the transparent liquid 150 in other parts of the enclosure space 115 to flow to the first pressing portions 130 and the protruding points 134, such that the first pressing portions 130 and the protruding points 134 expand, and the protruding points 134 protrude from the first pressing portions 130 in a direction D4.

In this embodiment, the protruding points 134 may be arranged in a Braille arrangement, and the arrangement of the protruding points 134 of each of the first pressing portions 130 corresponds to the pattern 132 associated with said each of the first pressing portions 130. As a result, the electronic device 200 having the keyboard device 100a not only is useful for users who have poor eyesight, but also is useful for blind users.

Figure 8:
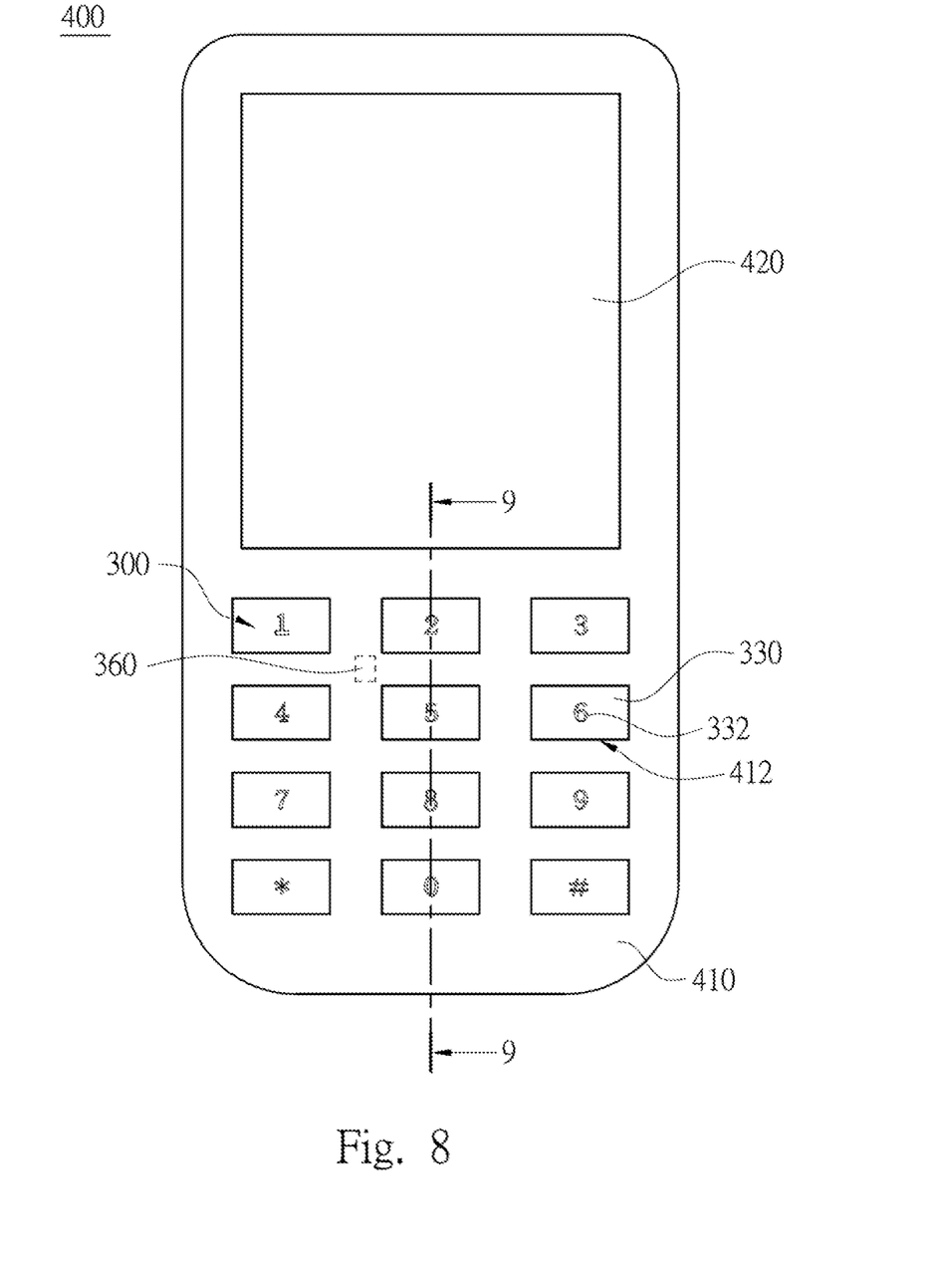
FIG. 8 is a front view of a keyboard device shown in a state mounted in an electronic device according to an embodiment of the present invention.
Figure 9:
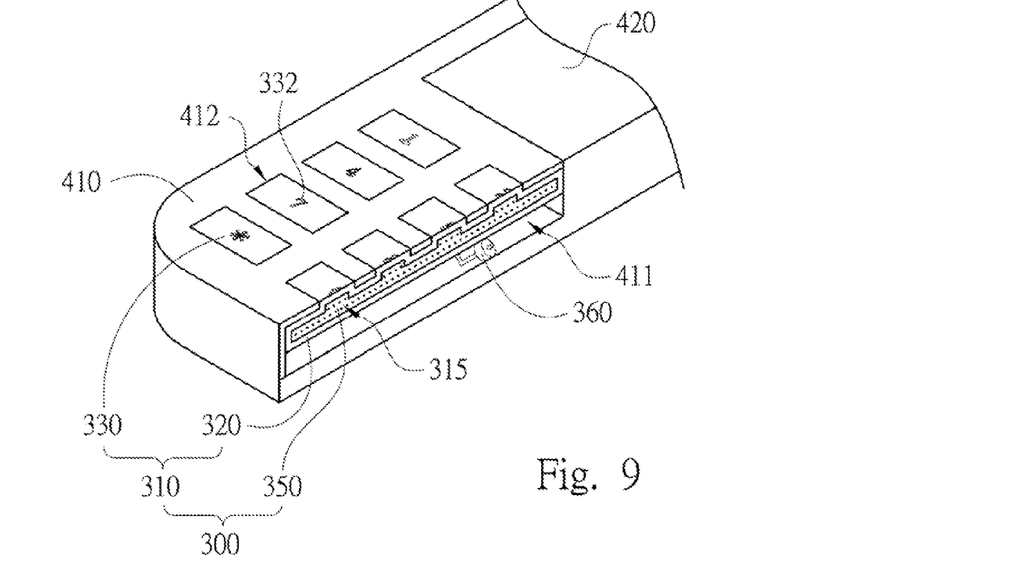
FIG. 9 is a cross-sectional view of the electronic device shown in FIG. 8 taken along line 9-9.

FIG. 8 is a front view of a keyboard device 300 shown in a state mounted in an electronic device 400 according to an embodiment of the present invention. FIG. 9 is a cross-sectional view of the electronic device 400 shown in FIG. 8 taken along line 9-9. As shown in FIG. 8 and FIG. 9, the keyboard device 300 is located in a first accommodating space 411 of a housing 410 of the electronic device 400, and the housing 410 has a plurality of openings 412 communicated with the first accommodating space 411.

The keyboard device 300 includes a flexible body 310, a fluid 350, and a pump 360. The flexible body 310 is located in the first accommodating space 411 and includes a main body 320, a plurality of pressing portions 330, and a plurality of patterns 332. The pressing portions 330 protrude from the main body 320, and are respectively located in the openings 412. The patterns 332 are located on a surface of the main body 320 or respectively on surfaces of the pressing portions 330. The patterns 332 are respectively exposed through the openings 412. The main body 320 and the pressing portions 330 have a second accommodating space 315 therein, such that the main body 320 and the pressing portions 330 are communicated with each other. The fluid 350 is located in the second accommodating space 315. The pump 360 is connected to the second accommodating space 315.

In this embodiment, the main body 320 and the pressing portions 330 may be integrally formed as a single piece. The flexible body 310 may be made of a material that includes plastic or rubber, but the present invention is not limited in this regard. Furthermore, the patterns 332 may include numbers, symbols, letters, or combinations thereof as deemed necessary by designers. The electronic device 400 may be a cellular phone, a telephone, or another electronic product having a key structure. The fluid 350 may include silicone, hydraulic oil, water, air, oxygen, or nitrogen.

Figure 10:
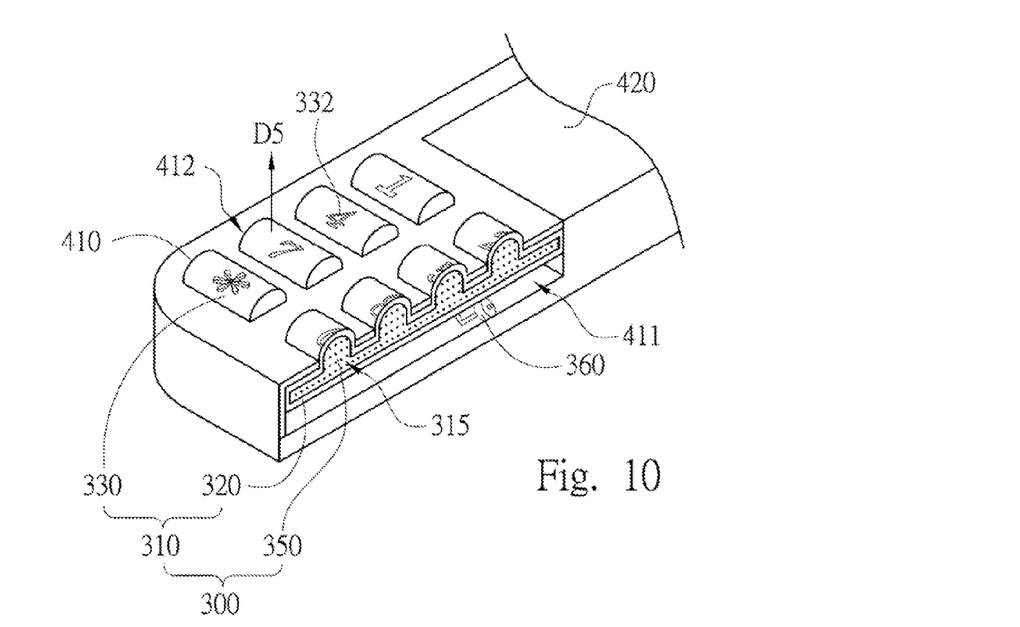
FIG. 10 is a cross-sectional view of electronic device shown in FIG. 9 after a pump of the keyboard device is compressed.

FIG. 10 is a cross-sectional view of the electronic device 400 shown in FIG. 9 after the pump 360 of the keyboard device 300 is compressed. As shown in FIG. 9 and FIG. 10, when the fluid 350 is compressed by the pump 360, the pressing portions 330 expand to protrude from the openings 412 of the housing 410 in a direction D5. As a result, the pressing portions 130 have a convex lens function, such that the patterns 332 can be enlarged.

In this embodiment, switching on or switching off the pump 360 may be controlled by an application program of the electronic device 400. When operating the electronic device 400, users can open the application program for controlling the pump 360 through a screen 420 of the electronic device 400, such that the pump 360 can operate to compress the fluid 350. As a result, the pressing portions 330 can expand to protrude from the openings 412 of the housing 410 in the direction D5, and the patterns 332 can be enlarged for easy reading by users.

Figure 11:
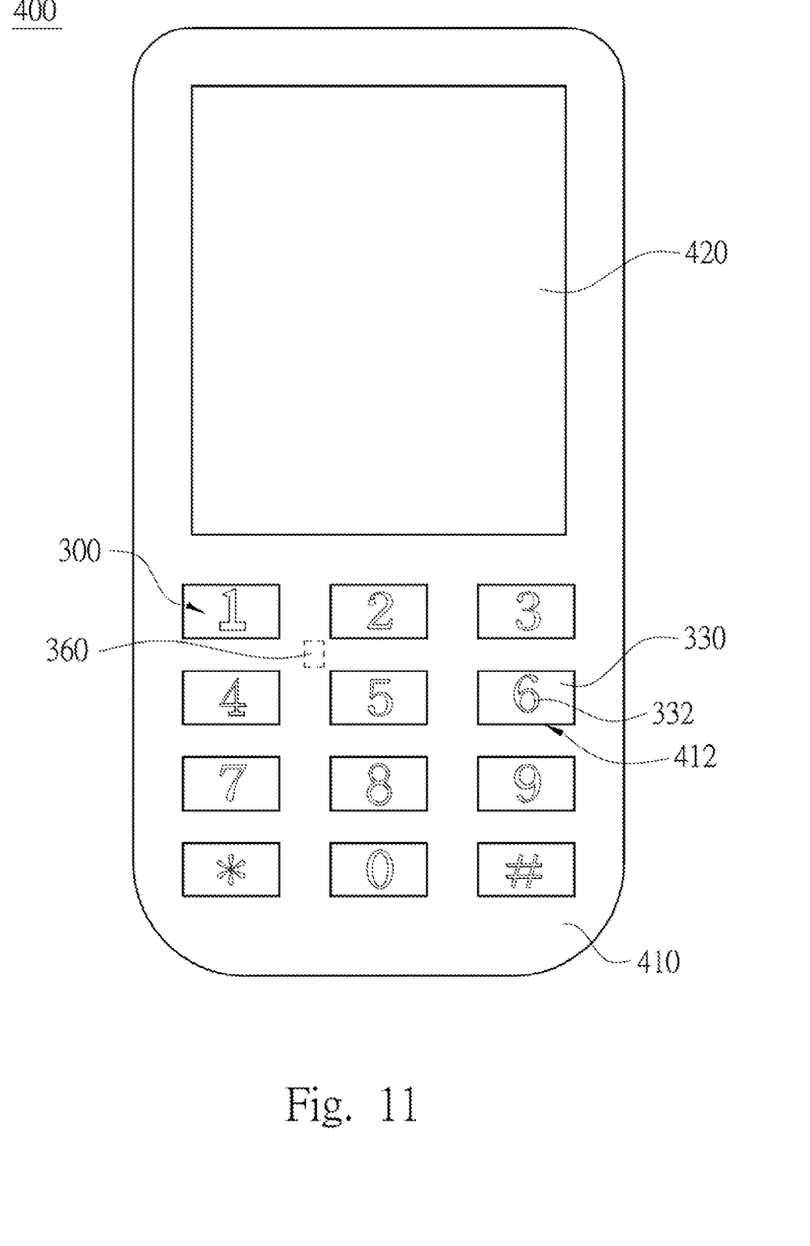
FIG. 11 is a front view of the electronic device shown in FIG. 8 after the pump of the keyboard device is compressed.

FIG. 11 is a front view of the electronic device 400 shown in FIG. 8 after the pump 360 of the keyboard device 300 is compressed. As shown in FIG. 8 and FIG. 11, the keyboard device 300 is not restricted by the size of the housing 410 of the electronic device 400, so that the pressing portions 330 with a small size can be used, and the patterns 332 can be enlarged by the convex lens function of the pressing portions 330.

Figure 12:
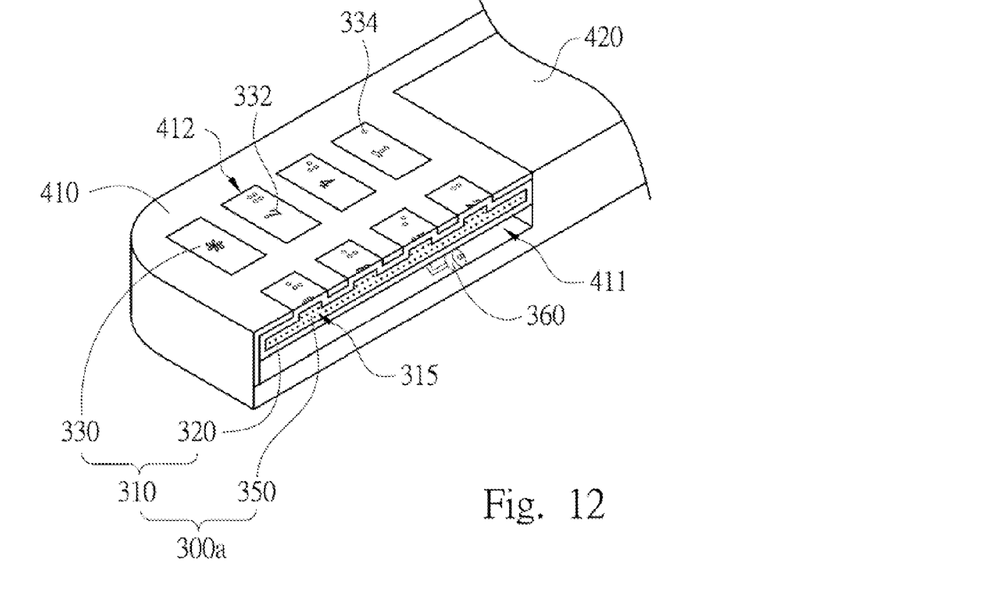
FIG. 12 is a cross-sectional view of a keyboard device shown in a state mounted in an electronic device according to an embodiment of the present invention.
Figure 13:
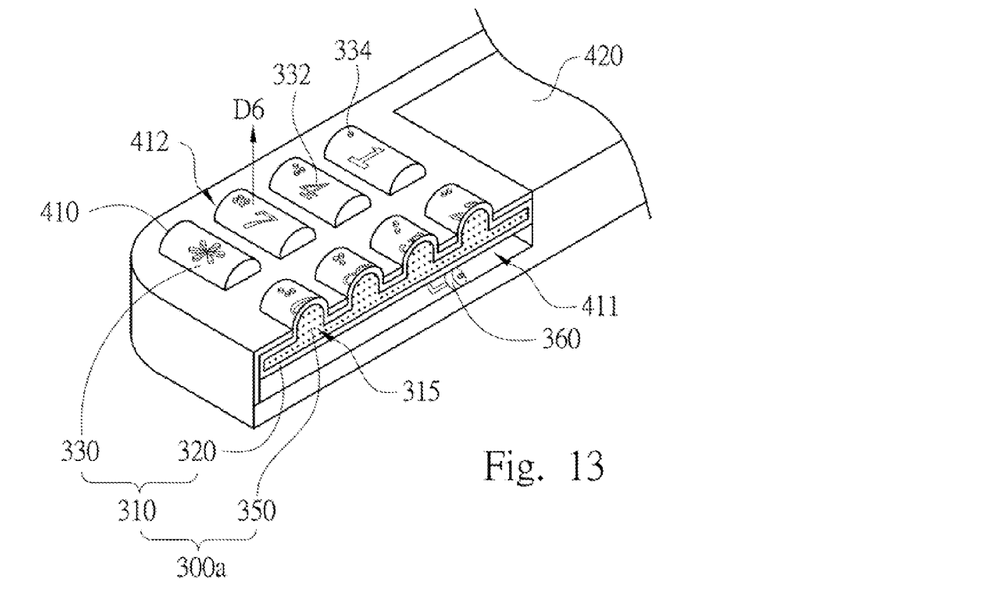
FIG. 13 is a cross-sectional view of the electronic device shown in FIG. 12 after a pump of the keyboard device is compressed.

FIG. 12 is a cross-sectional view of a keyboard device 300a shown in a state mounted in an electronic device 400 according to an embodiment of the present invention. FIG. 13 is a cross-sectional view of the electronic device 400 shown in FIG. 12 after a pump 360 of the keyboard device 300a is compressed. As shown in FIG. 12 and FIG. 13, the difference between this embodiment and the embodiment shown in FIG. 9 and FIG. 10 is that each of the pressing portions 330 has at least one protruding point 334, and a space in each of the protruding points 334 is communicated with the second accommodating space 315. When the fluid 350 is compressed by the pump 360, the fluid 350 flows to the pressing portions 330 and the protruding points 334, such that the pressing portions 330 and the protruding points 334 expand, and the protruding points 334 protrude from the pressing portions 330 in a direction D6.

In this embodiment, the protruding points 334 may be arranged in a Braille arrangement, and the arrangement of the protruding points 334 of each of the pressing portions 330 corresponds to the pattern 332 associated with said each of the pressing portions 330. As a result, the electronic device 400 having the keyboard device 300a not only is useful for users who have poor eyesight, but also is useful for blind users.

Compared with the prior art, the keyboard device does not need to include large keys to allow for the printing of large numbers and letters thereon, so that the size of the electronic device having the keyboard device can be reduced. Therefore, the cost of the electronic device can be decreased. Furthermore, the keyboard device is not restricted by the size of the housing of the electronic device, so that the pressing portions with a small size can be used, and the patterns can be enlarged by the convex lens function of the pressing portions. The keyboard device can be provided for users who are elderly or have poor eyesight to enable such users to accurately read the patterns associated with the pressing portions, thereby minimizing situations in which users press the wrong keys.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A keyboard device located in an accommodating space of a housing, wherein the housing has a plurality of first openings and a second opening, and the first and second openings are communicated with the accommodating space, and the keyboard device comprises:
   a flexible body located in the accommodating space and comprising:
     a main body;
     a plurality of first pressing portions protruding from the main body and respectively located in the first openings;
     a plurality of patterns located on a surface of the main body or surfaces of the first pressing portions, wherein the patterns are respectively exposed through the first openings; and
     a second pressing portion protruding from the main body and located in the second opening, wherein the main body, and the first and second pressing portions have an enclosure space therein, such that the main body, and the first and second pressing portions are communicated with each other; the area and the height of the second pressing portion are respectively greater than the area and the height of each of the first pressing portions; and
   a transparent liquid located in the enclosure space, wherein when the second pressing portion is pressed, the first pressing portions expand to protrude from the first openings due to the transparent liquid flowing into the first pressing portions, such that the patterns are enlarged; the viscosity of the transparent liquid is in a range from 1500 to 50000 CPS, such that when the second pressing portion is released, the patterns remain enlarged for a period of time.

2. The keyboard device of claim 1, wherein the transparent liquid comprises silicone or hydraulic oil.

3. The keyboard device of claim 1, wherein the flexible body is made of a material that comprises plastic or rubber.

4. The keyboard device of claim 1, wherein the main body, and the first and second pressing portions are integrally formed as a single piece.

5. The keyboard device of claim 1, wherein the area of the second pressing portion is larger than the area of each of the first pressing portions.

6. The keyboard device of claim 1, wherein the patterns comprise numbers, symbols, letters, or combinations thereof.

7. The keyboard device of claim 1, wherein each of the first pressing portions has at least one protruding point, and a space in each of the protruding points is communicated with the enclosure space, and when the second pressing portion is pressed, the transparent liquid adjacent to the second pressing portion is displaced to force the transparent fluid in other parts of the enclosure space to flow to the first pressing portions and the protruding points, such that the protruding points expand to protrude from the first pressing portions.

8. The keyboard device of claim 7, wherein the protruding points are arranged in a Braille arrangement.

* * * * *